United States Patent [19]

Zenna

[11] Patent Number: 4,752,177
[45] Date of Patent: Jun. 21, 1988

[54] MOTORCYCLE TRAILER APPARATUS

[76] Inventor: Luigi Zenna, 4026 E. Yowy, Phoenix, Ariz. 85044

[21] Appl. No.: 853,689

[22] Filed: Apr. 18, 1986

[51] Int. Cl.⁴ .............................................. B60P 1/02
[52] U.S. Cl. .................................... 414/495; 280/656; 280/789; 410/3
[58] Field of Search ........... 280/400, 789, 656, 405 R, 280/476 R, 490 R, 491 R, 43.24, 2, 414.1, 415 R, 43.11, 43.14, 43.17, 43.18, 43.23, 43.24, 402, 289 A, 292; 410/3, 19; 414/495, 540, 228, 462, 563

[56] References Cited

U.S. PATENT DOCUMENTS

| | | | |
|---|---|---|---|
| 2,487,508 | 11/1949 | Anderson | 280/43.11 |
| 2,495,449 | 1/1950 | Francis | 280/414.1 |
| 3,025,985 | 3/1962 | Crawford | 280/414.1 |
| 3,740,074 | 6/1973 | Coil | 280/292 |
| 4,077,642 | 3/1978 | Clark | 280/43.23 |
| 4,243,243 | 1/1981 | Edmister | 414/462 |
| 4,488,735 | 12/1984 | Hehr | 280/656 |

FOREIGN PATENT DOCUMENTS 686321 1/1953 United Kingdom ............. 280/43.11

Primary Examiner—John J. Love
Assistant Examiner—Everett G. Diederiks, Jr.
Attorney, Agent, or Firm—Harry M. Weiss & Associates

[57] ABSTRACT

A highly efficient motorcycle trailer apparatus having a generally u-shaped side member and an elongated guide member therebetween substantially supported by at least two opposing vertical members having hydraulic members integrally attached thereto is disclosed. The hydraulic members are operably coupled to the elongated guide member, centrally located therebetween two opposing sides of said u-shaped side member. A motor is operably joined to a hydraulic reservoir means coupled to a hydraulic line means of the hydraulic members to permit smooth raising and lowering of the elongated guide member for mounting or dismounting a motorcycle thereon.

7 Claims, 3 Drawing Sheets

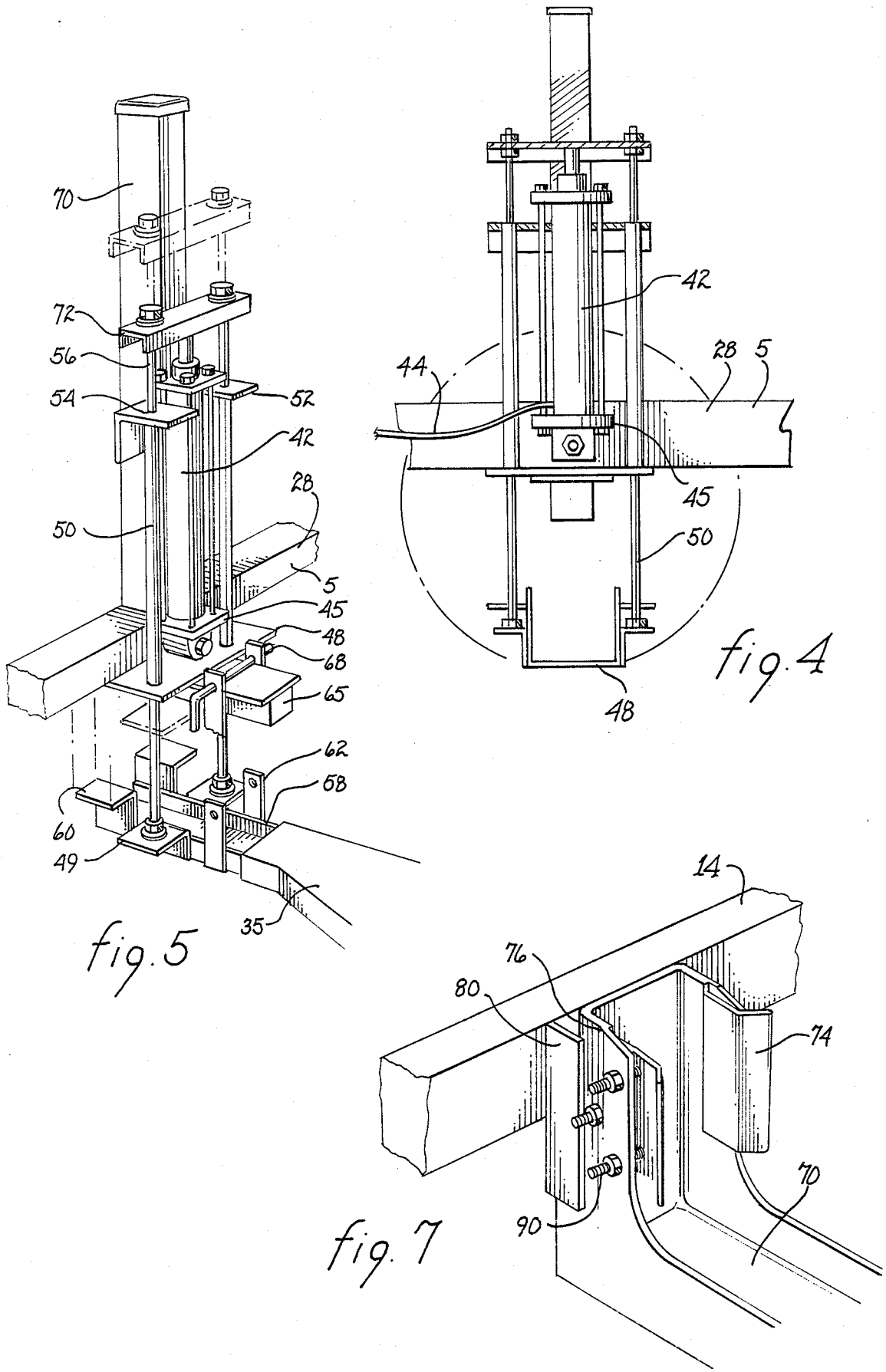

MOTORCYCLE TRAILER APPARATUS

BACKGROUND OF THE INVENTION

1. Field of the Invention

This invention generally relates to a concept of providing a trailer apparatus and method for rapid and efficient securing and transporting a motorcycle by the use of an electrically operated motor operably connected to a hydraulic means for lowering and raising a track guide member for accommodating therein the tires of said motorcycle. The track guide member is located therebetween a stationary u-shaped side member; each side portion of said stationary u-shaped side member operably secured proximate each tire member. Moreover, at least one hydraulic means is operably engaged with at least one vertical support member for allowing said hydraulic means to be operable therealong each of said vertical support member. At least one horizontally extending side support member is provided for operably coupling said track guide member and said u-shaped side member.

The trailer apparatus and method of the present invention permits the track guide member to be lowered, relative to the stationary member to permit the motorcycle wheels to be accommodated thereon. The track guide member is raised towards the stationary member and locked thereto ready for transporting said motorcycle.

2. Description of the Relevant Art

There has been a substantial need for efficiently securing and transporting a motorcycle on a trailer for coupling to a motor vehicle. Trailers are generally used for providing a means for accommodating a motorcycle to preclude occupying much needed space inside a motor vehicle. Moreover, a trailer is used for rapid access to a motorcycle. Accordingly, apparatuses were devised for providing a motorcycle trailer. As in U.S. Pat. No. 4,448,735 filed by H. Hehr on Feb. 2, 1983 and issued on Dec. 18, 1984 wherein a collapsible trailer having diverging side members and a central elongated member for supporting and guiding the wheels of a mounted motorcycle thereon is disclosed. Here, however, the trailer having the member supporting said motorcycle remains at a fixed elevation at a relatively high position relative to the ground; thus requiring a user to lift the motorcycle upon dismounting of the same. An improvement of the Hehr trailer appears to have been taught in U.S. Pat. No. 4,490,089 filed by T. L. Welker on Aug. 26, 1982 and issued on Dec. 25, 1984 wherein an easily removable trailer is provided to allow the rapid disconnection thereof from a vehicle to allow the trailer front end to abut the ground thereby allowing the trailer to forwardly slant for permitting the motorcycle thereon to be guided away therefrom. Moreover, the Welker is suitable for disconnecting from the trailer for laying above the ground, a cumbersome procedure of dismantling a plurality of trailer members is thus required. Although, a hydraulic lift trailer in U.S. Pat. No. 2,648,546 filed by J. C. Falkenhagen on July 12, 1949 and issued on Aug. 11, 1953 discloses a hydraulic lift trailer, the Falkenhagen patent clearly utilizes a cumbersome spring loaded arrangement for supporting the trailer frame and further utilizes a throttle for controlling the movement of the frame. Moreover, a stabilizing cable is used to minimize inherent unstableness of the combined structural features therein. Further, patents are available which are suitable for attaching to a motor vehicle, including: U.S. Pat. No. 2,774,606, filed by L. Burweger et al. on June 17, 1954 and issued on Dec. 18, 1956; U.S. Pat. No. 2,835,400, filed by B. C. Latzke on Sept. 8, 1955 and issued on May 20, 1958; U.S. Pat. No. 3,271,042, filed by F. L. Flodin on Jan. 9, 1964 and issued on Sept. 6, 1966; U.S. Pat. No. 3,866,935, filed by C. C. Nelson on Jan. 30, 1973 and issued on Feb. 18, 1975; and U.S. Pat. No. 4,003,583, filed Aug. 18, 1975 by N. L. Stanzel and issued on Jan. 18, 1977. The above-cited patents are matters of interest for showing a trailer, but do not in any way relate or remotely suggest the structures, cooperation of parts, result or advantages of the instant invention. Moreover, the above references disclose trailers which can be cumbersome in manufacture and inefficient in operation, particularly for use in mounting and transporting a motorcycle. Accordingly, there is a substantial need to avoid the above-mentioned problems existing with previously patented apparatuses by providing thereby the present invention.

In the present invention, a motorcycle trailer has a centrally located guide member operably supported by hydraulically operated members integral to at least two opposing substantially parallel side members to permit rapid and efficient mounting and dismounting of a motorcycle thereon.

It is therefore an object of the present invention to provide an improved motorcycle trailer apparatus suitable for providing an easily operable set of hydraulic members for lowering and raising a guide member for accommodating a motorcycle thereon.

It is another object of the present invention to provide an improved motorcycle trailer apparatus having a motorcycle trailer apparatus and method having a motor operably joined to a hydraulic reservoir by a hudraulic line to permit a set of hydraulic cylinders to raise and lower a centrally located elongated guide member for supporting thereon a motorcycle.

It is yet another object of the present invention to provide an improved motorcycle trailer appartus which can be easily and economically manufactured, yet sturdy in construction and highly efficient in operation.

It is yet a further object of the present invention to provide an improved motorcycle trailer apparatus and method which is constructed with extreme simplicity, embodying relatively simple parts, and therefore capable of being retailed for a low price, long lasting in use, and extremely convenient to use.

SUMMARY OF THE INVENTION

The aforementioned and other objects of the present invention are accomplished by providing a highly efficient motorcycle trailer apparatus having a generally u-shaped side member and an elongated guide member therebetween substantially supported by at least two opposing vertical members having hydraulic members integrally attached thereto. The hydraulic members are operably coupled to the elongated guide member, centrally located therebetween two opposing sides of said u-shaped side member. A motor is operably joined to a hydraulic reservoir means coupled to a hydraulic line means of the hydraulic members to permit smooth raising and lowering of the elongated guide member for mounting or dismounting a motorcycle thereon.

These and other features of the present invention will be understood upon reading of the following description along with the drawings.

BRIEF DESCRIPTION OF THE DRAWINGS

FIG. 4 is a side elevational view of a hydraulic member with an associated member of the u-shaped side member.

FIG. 5 is a perspective view of the hydraulic member operably coupled to a side portion of the elongated guide member with an associated side member of the u-shaped side member and vertical side member.

FIG. 7 is a perspective view of the front portion of the elongated guide member.

DETAILED DESCRIPTION OF THE PREFERRED EMBODIMENTS

Figure 1:
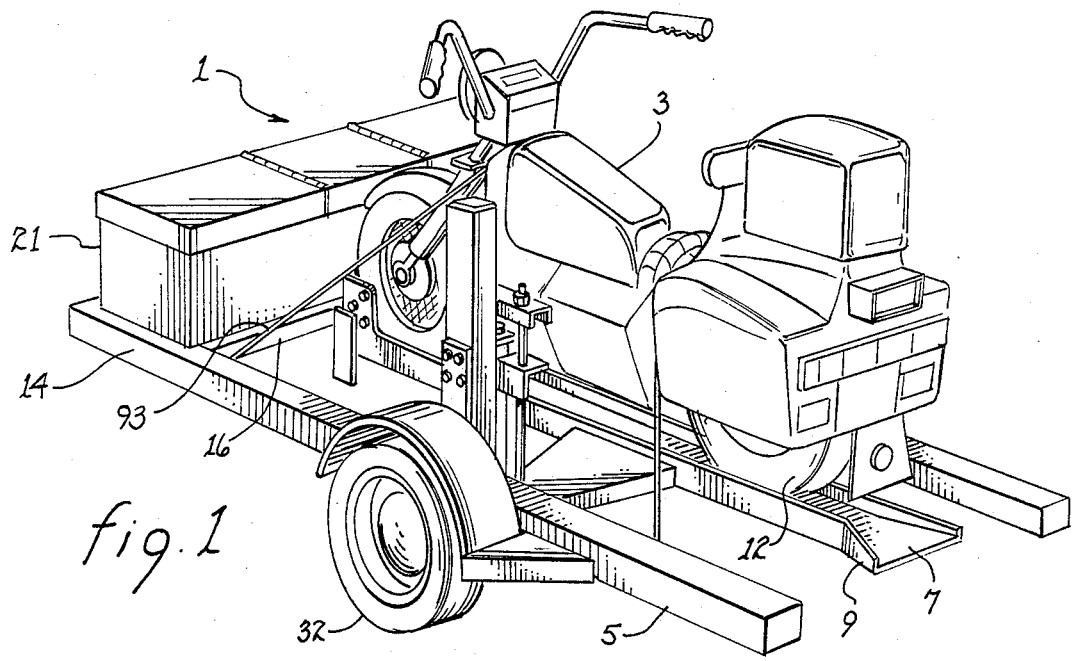
FIG. 1 is a perspective view of an improved motorcycle trailer apparatus ready for transporting.

FIG. 1 is a perspective view of the motorcycle trailer apparatus, generally referred to by reference number 1, showing the manner in which a motorcycle 3 is mounted thereon for stabilizing and transporting thereto. Here, a u-shaped side member 5 integral along the trailer apparatus 1 is stationary therethroughout for supporting the mounted motorcycle 3, as will be further discussed. A centrally located elongated guide member 7 therebetween the u-shaped side member 5, as shown, is provided for guiding and mounting the motorcycle 3 thereon. The guide member 7 has outwardly extending flanges 9 for inwardly guiding the motorcycle 3, specifically the tires 12, when mounting thereon. The front portion 14 of the u-shaped side member 5 has a plate member 16 integrally coupled thereto for allowing a box member 21 mounted thereon for housing at least one battery 26, a hydraulic motor and pump unit 22, including an integral hydraulic fluid reservoir, a plurality of hydraulic hoses 44 (one shown) and a switch device operably coupled with the hydraulic cylinder 42 (see FIGS. 2, 4 and 5, infra) in a conventional manner.

Figure 2:
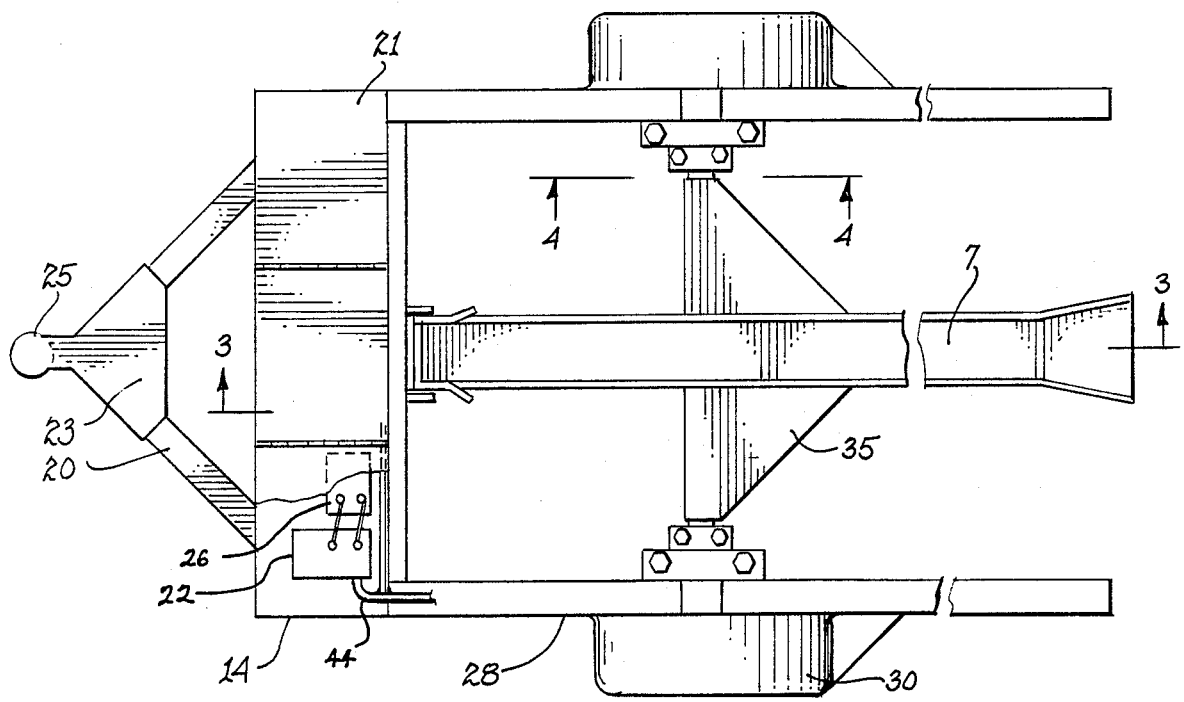
FIG. 2 is a partially cutaway top elevational view of the improved motorcycle trailer apparatus showing a generally u-shaped side member operably coupled to an elongated guide member therebetween.

In FIG. 2, a top elevational view of the motorcycle trailer apparatus 1 is shown having a v-shaped member 20 extending therefrom the front portion 14 of the trailer apparatus 1. A support member 23 may be integrally coupled to the v-shaped member 20 to provide stability and strength thereto. The front end of the v-shaped member 20 has integral thereto a coupling member 25 suitable for removably attaching thereto a vehicle which transports the trailer appartus 1.

As depicted in the cutaway portion of FIG. 2, an electrically powered hydraulic motor and pump unit 22 is electrically connected to a power source battery 26. The hydraulic motor and pump unit 22 is operably connected to a hydraulic cylinder member 42 (see FIG. 4) by a cylinder hose member 44 which passes operably to and from the hydraulic fluid storage portion of the hydraulic motor and pump unit 22.

Although not shown, a conventional wheel and bracket combination may be operably coupled therebelow the front end of the v-shaped member 20 for support thereof when the trailer apparatus 1 is not in use. As further shown in FIG. 2, the side portions 28 of the u-shaped side member 5 has a fender member 30 integrally coupled thereto located thereabove the operably coupled tire members 32 (see FIG. 1, supra). the guide member 7 has on its sides integrally coupled and extending therefrom a side support member 35 for operably coupling to the side portions 28 of the u-shaped side member 5 (see also FIG. 5, infra).

Figure 3A:
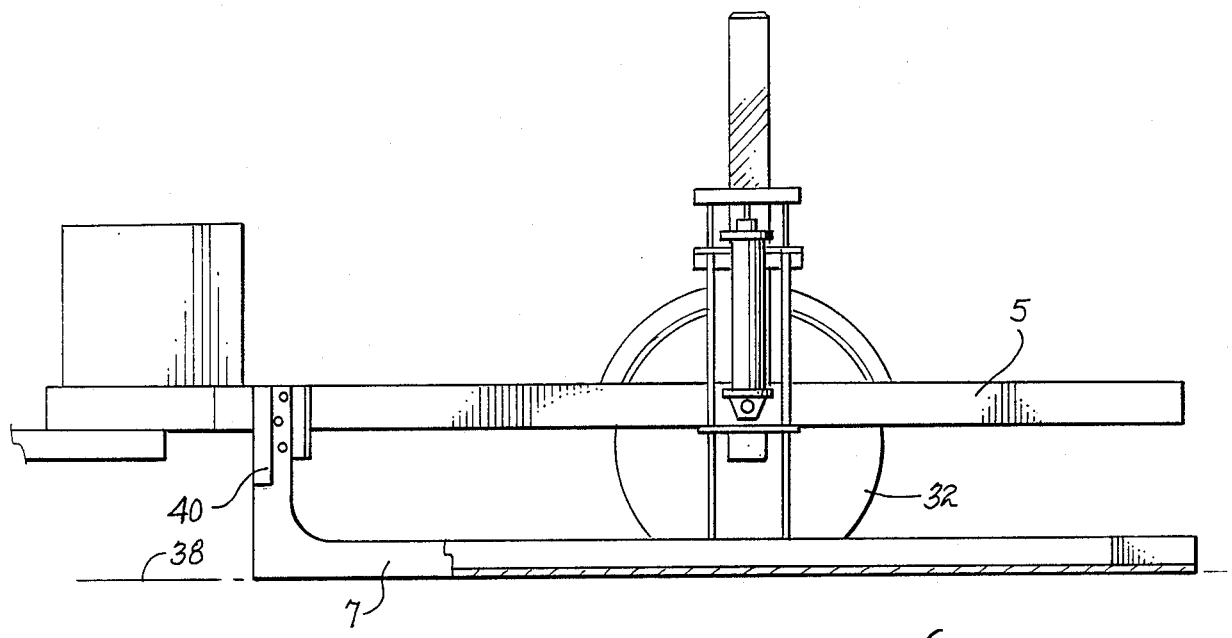
FIG. 3a is a partial cross-sectional elevational view of the improved motorcycle trailer apparatus taken along line 3—3 of FIG. 2 showing the elongated guide member in a lowered position ready to mount a motorcycle thereon.
Figure 3B:
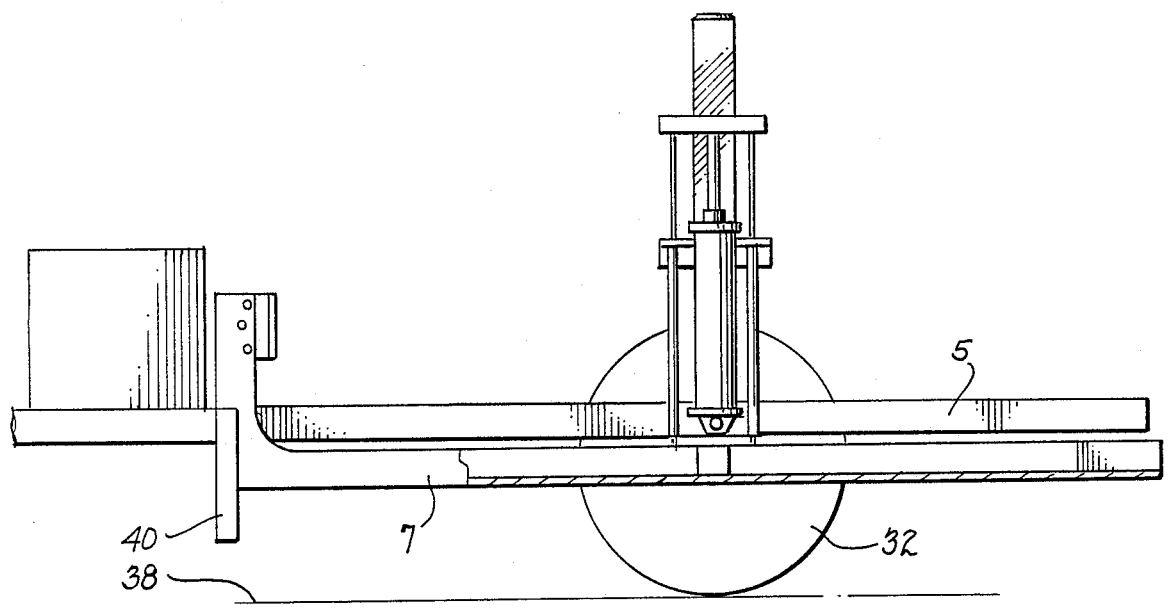
FIG. 3b is a partial cross-sectional view of the improved motorcycle trailer apparatus taken along line 3—3 of FIG. 2 showing the elongated guide member in a raised position.

As illustrated in FIGS. 3a and 3b, the centrally located guide member 7 is shown in the lowered and raised positons, respectively. When in the lowered position, the guide member 7 is suitable for guiding and mounting thereon the motorcycle 3. When in the raised position, the guide member 7 completely clears the ground 38. The guide member 7 is braced in its raising and lowering operations by a vertical brace member 40 for allowing effective functioning thereof. It is to be noted that all throughout the raising and lowering operations of the guide member 7, the u-shaped side member 5 remains stationary relative to both the guide member 7 and the ground 38.

In FIG. 4, the hydraulic cylinder member 42 is shown having the cylinder hose member 44 extending therefrom for connecting thereto the hydraulic fluid storage reservoir portion of the pump and motor unit 22 (see FIG. 2) inside the box member 21. The hydraulic cylinder 42 is integrally mounted onto the side portion 28 of the u-shaped side member 5 by a mounting member 45, better illustrated in FIG. 5, infra. The hydraulic cylinder 42 may be conventional; such as that manufactured by Prince Distributors of Sioux, Iowa. A generally first u-shaped plate member 49 is integrally coupled to vertical support members 50 for supporting thereon the side support members 35 (see also FIG. 5, infra).

As shown in FIG. 5, the mounting member 45 is integrally joined to the side portion 28 of the u-shaped side member 5 for integrally mounting thereon the hydraulic cylinder 42. Moreover, a horizontal plate member 48 is coupled preferably below the side portion 28 for integrally mounting thereon at least one outside tubular member 50 therebetween the first u-shaped plate member 49 and a generally L-shaped mounting bracket member 52. The L-shaped mounting bracket member 52 has an aperture 54 passing therethrough to accommodate therein a sliding vertical member 56 which passes through the outside tubular member 50.

Therebelow the hydraulic cylinder 42 is the side support member 35 having an extending member 58 coupled thereto. The end of the extending member 58 has a generally second u-shaped plate member 60 coupled thereto suitable for bracing onto the bottom portion of the side portion 28 of the u-shaped members 5 to essentially maximize the upward travel of the side support members 35 with the guide member 7 coupled thereto. Apertured vertical plate members 62 are coupled to the extending member 58 to permit removable coupling thereto a support bar member 65 integrally coupled and extending therefrom the side portion 28 of the u-shaped side member 5 preferably therebelow the horizontal plate member 48. When the extending member 58 is substantially raised, a locking pin 68 is used, as shown, to pass through the vertical plate member 62 thereabove the support bar member 65. As further shown in FIG. 5, a stationary vertical support member 70 is integrally coupled thereabove the side portion 28 of the u-shaped side member 5 to permit the attaching thereto of the generally L-shaped mounting bracket member 52.

To permit a stable and efficient raising and lowering of the extending member 58, at least two sliding vertical members 56 are preferred which are braced together by a bar member 72 as shown.

Figure 6:
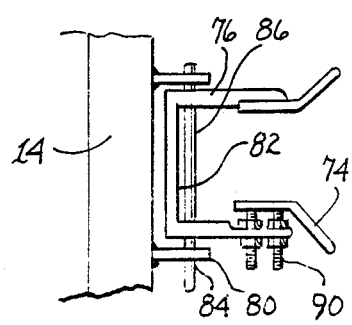
FIG. 6 is a top elevational view of a front portion of the elongated guide member.

As illustrated in FIG. 6, at least a pair of outwardly extending flanges 74 are coupled to the front portion 14 of the u-shaped front end member 76 of the guide member 7, as better illustrated in FIG. 7, infra. The front end member 76 of the guide member 7 is joined to the front portion 14 by member 80 integrally coupled thereto. The member 80 is removably coupled by an elongated pin member 86 passing therethrough apertures 82, 84 of the u-shaped front end member 76 and member 80, respectively. The outwardly extending flanges 74 are made of sturdy yet flexible material to permit efficient guidance and support of the preferably front tire of the motorcycle 3. When in use, the flanges 74 may be horizontally adjusted by having at least one flange 74 adjustably coupled to at least one of the sides of the front end portion 76 by means of a combination of a plurality of nuts and threaded bolts 90. Such a horizontal movement would allow the flanges 74 to snugly fit the preferably front wheel of the motorcycle 3 when mounted thereon.

As further illustrated in FIG. 7, the upwardly extending u-shaped front end member 76 is preferably a continuous member extending therefrom the elongated guide member 7 which itself has a preferably u-shaped cross-section for guiding a supporting the tires 12 of the motorcycle 3 removably mounted thereon. To further support the motorcycle thereabove the trailer 1, a plurality of strap and hook member combination 93 may be removably connected to the motorcycle 3 and preferably the side portions 28 of the u-shaped side member 5 (see FIG. 1, supra).

While the invention has been particularly shown and described in reference to preferred embodiments thereof, it will be understood by those skilled in the art that changes in from and details may be made without departing from the spirit and scope of the invention.

I claim:

1. A motorcycle trailer apparatus, comprising, in combination:
   a motorcycle;
   a u-shaped side member means operably mounted over at least one tire means of said trailer apparatus, said u-shaped side member means comprising two laterally spaced, longitudinally extending members and a laterally extending cross member;
   an elongated guide member means centrally located therebetween said u-shaped side member means, said elongated guide member means being u-shaped with an elongated motorcycle supporting portion and two upwardly extending guiding portions for guiding and supporting said motorcycle thereon;
   wheel engaging means being vertically oriented and operably coupled to a front end portion of said elongated guide member means and having opposing outwardly extending flange means for laterally supporting a leading portion of a front tire of said motorcycle therebetween, said flange means being adjustable to accommodate motorcycle tires of different widths, said flange means also being of non-rigid character;
   two laterally extending side support member each integrally coupled to a respective side of said elongated guide member means
   two hydraulic cylinder means each operatively coupled between a side support member and a respective longitudinally extending member of said u-shaped side member means for raising and lowering said support member means and concurrently raising and lowering said guide member means, said raising and lower being accomplished while said guide member means remains substantially horizontally oriented;
   at least one hydraulic motor means for operating said two hydraulic cylinder means; and
   at least one battery means for operating said hydraulic motor means.

2. The motorcycle trailer apparatus of claim 1 further comprising a securing means at the front portion of said elongated guide member means for securing at least one wheel means of said motorcycle mounted thereover said guide member means.

3. The motorcycle trailer apparatus of claim 2 further comprising a coupling member means integrally attached to the cross member of said u-shaped side member means for removably coupling to a vehicle.

4. The motorcycle trailer apparatus of claim 3 further comprising a locking means for removably locking each said side support member means to said u-shaped side member means when said guide member means is in a completely raised position.

5. The motorcycle trailer apparatus of claim 4 further comprising a vertical guide means mounted to said cross member for guiding the front portion of said elongated guide member means when being lowered and raised.

6. The motorcycle trailer apparatus of claim 5 further comprising a box member means mounted thereabove the front portion of said u-shaped side member means for housing said hydraulic motor means and said battery means.

7. The motorcycle trailer apparatus of claim 1 wherein said elongated guide member means has a back portion have outwardly extending flanges for initially guiding said wheel means of said motorcycle onto said elongated guide member means.

* * * * *